V. E. DUNCANSON.
SPECTACLE HOLDER.
APPLICATION FILED JULY 3, 1919.
1,391,674. Patented Sept. 27, 1921.
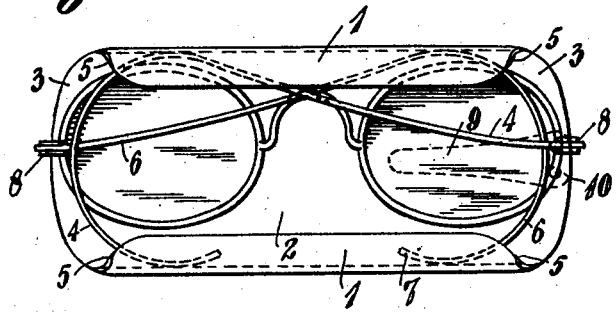
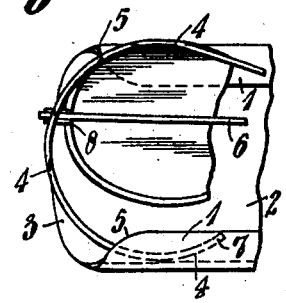
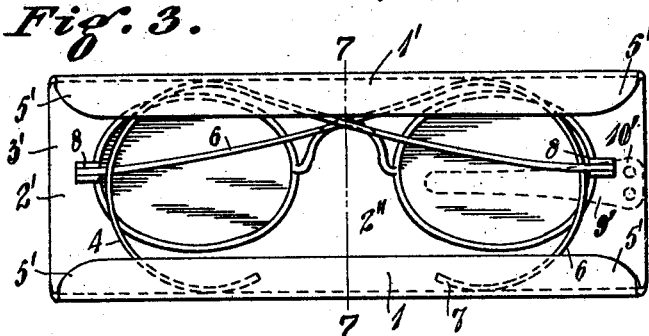
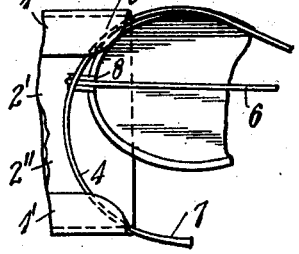
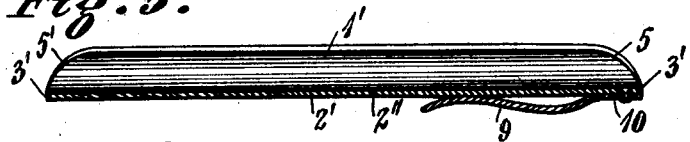
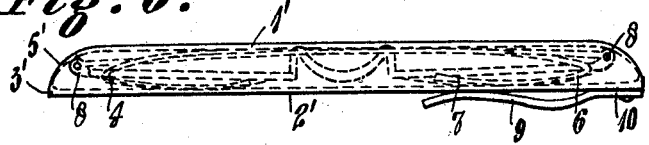
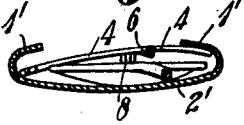
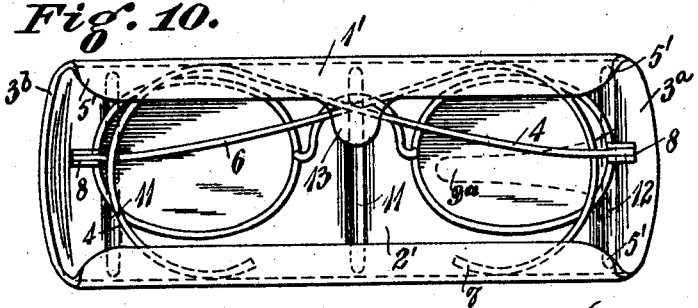
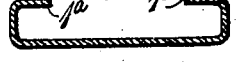

UNITED STATES PATENT OFFICE.

VINCENT E. DUNCANSON, OF LYNCHBURG, OHIO.

SPECTACLE-HOLDER.

1,391,674.    Specification of Letters Patent.    Patented Sept. 27, 1921.

Application filed July 3, 1919. Serial No. 308,378.

*To all whom it may concern:*

Be it known that I, VINCENT E. DUNCANSON, a citizen of the United States, and a resident of Lynchburg, in the county of Highland and State of Ohio, have invented certain new and useful Improvements in Spectacle-Holders, of which the following is a specification.

My invention relates to receptacles, cases and the like, of the class set forth in my application, Serial No. 91,664, filed April 17th, 1916, for improvements in eyeglass holders, said application resulting in Patent #1,309,573, issued July 8, 1919.

The object of my invention is to provide means for holding spectacles having resilient bows or other resilient parts which will be held by the pressure of their resilient parts in the holder; and to dispense with covers for the holders, whereby the holder will be of simple and inexpensive construction and will permit of quick insertion or removal of the glasses. Other objects will appear in the course of the ensuing description.

My invention consists in the combination of parts and in the details of construction and arrangement of parts and in the new and improved article of manufacture as will hereinafter be more fully described and claimed.

In the drawings:

Figure 1 is a plan view of a spectacle-holder embodying my invention and showing how the spectacles are held therein;

Fig. 2 is a partial similar view showing how the spectacles are inserted;

Fig. 3 is a view similar to Fig. 1 showing a modification;

Fig. 4 is a partial view of the modified holder of Fig. 3 showing another way of placing the spectacles in the holder;

Fig. 5 is a medial section of the same with the spectacles omitted;

Fig. 6 is a side elevation of the same with the spectacles contained therein;

Fig. 7 is a vertical cross-section on a plane corresponding to the line 7—7 of Fig. 3;

Fig. 8 is a similar cross-section with the spectacles omitted but showing a further modification;

Fig. 9 is a similar cross-section showing another modification; and

Fig. 10 is a plan view of a holder embodying another modification of my invention and showing how the spectacles are held therein.

As shown in Figs. 1 and 2 the holder is made up of a single piece of sheet material, such as metal, celluloid or the like, of general oblong shape with its longitudinal edge parts 1 turned up and folded inwardly over its main back part 2. The end parts 3 of the piece of material, however, are curved so that the edge parts 1 that are turned upward and inward are shorter than the main part 3. This makes a holder that will not unduly wear the pocket in which it is carried. The spectacles preferably have their bows 4 inserted under one edge part 1 and compressed till the other side of the spectacles snap under the other edge part 1, as shown in Fig. 2. Another way of inserting is to place one end of the spectacles down upon the projected part or ledge 3, as shown in Fig. 4, while the adjacent end loop of the bow 4 of the spectacles is brought down to slide easily into the contracting entrance under the adjacent ends 5 of the turned-in edge parts 1. Further movement of the spectacles longitudinally into the holder results in the loop of the bow 4 being pressed together between and under the edge parts 1; and then when the loop of the other bow of the spectacles reaches this entrance it readily rides under the ends 5 of the edge parts 1 if its free end 7 is pressed down to enter under the adjacent end 5 at that side of the holder. The spectacles will then occupy the holder, as shown in Fig. 1 with the slightly compressed bow loops 4 and 6 pressing out and up against the turned-in edge parts 1 and frictionally retaining the spectacles in the holder. In this example the holder has its greatest length somewhat less than the extreme length of the spectacles from one hinge part 8 to the other, so that these hinge parts 8 project past the end ledges 3 of the holder slightly to be readily grasped by the thumb and finger to withdraw the spectacles. On the rear side of the main back part 2 a clip 9 has its widened end part 10 suitably secured to the part 2 near one end as by rivets indicated, and extends along the back of the holder for some distance with the remainder of its length free to slip over the edge of a garment pocket in a well known manner, to retain the holder in the pocket.

In the example of Figs. 3 to 7, inclusive, the holder has the edge parts 1' turned upward and inward as in the preceding example; but the oblong piece of sheet material does not have its ends rounded except at the corners. This provides the desirable rounding at each end of the holder where the rounding of the corners of the material produces the smooth ends 5' of the edge parts 1', but leaves the ends 3' of the main back part 2' without as much projection. This holder has the clip 9' with its end part 10' fastened to the holder near one end as in the preceding example.

As will be seen in Fig. 4, the end 3' of of the main back part 2, although not projecting so far as in the preceding example, acts as a ledge or guiding support to assist in starting the spectacles under the ends 5' into the holder, very much as in the preceding example.

In this example, as will be seen in Fig. 7, the edge parts 1' incline slightly upwardly in the cross-section, permitting the higher side 11 of the spectacle bow loop 4 to bear far in against the under side of the part 1'. This is desirable, as permitting very easy insertion of the spectacles into the holder; and may usually be depended upon to afford sufficient gripping effect to retain the spectacles. Any of these holders, however, may be of the slightly modified cross-section shown in Fig. 8 in which the edges 1'' of the material are inclined downwardly in the cross-section and these extreme edges will, therefore, bear against successive parts of the spectacle bows and, by thus affording multiplied contacting surfaces, somewhat better retain the spectacles in the holder. And this provision does not materially interfere with the insertion of the glasses into the holder.

The cross-section of the holder may be otherwise varied with a view to providing better gripping effect or as a matter of appearance of the holder; as for instance, where the edge parts of the material are turned upward and inward they may more closely approximate a rectangular cross-section, as shown at 1ᵃ Fig. 9 instead of the more uniform curvature of the other examples.

The holder shown in Fig. 10 is similar to the preceding examples; having curved end parts as in Fig. 1. One of these curved end parts 3ᵃ is very similar to those of Fig. 1; but the opposite end part 3ᵇ is bent up across the entrance and provides a stop at this end for the spectacles which may thus be inserted only at the other end of the holder. This holder has the clip 9ᵃ cut and pressed out from its back. With the exception of having this stop, the construction and operation of this holder is the same as in the other example.

It will be understood that the cross-section of any of these holders may be according to Fig. 7 or modified as in Figs. 8 or 9, or otherwise modified under such circumstances as were hereinbefore alluded to. Likewise it will be understood that either the example of Figs. 1 and 2 or that of Figs. 3 to 7, inclusive, may have the turned-up part to provide a stop at one end.

In the examples of Figs. 3 to 7, inclusive, and of Fig. 10, the extreme length of the holder is greater than that of the glasses from one hinge 8 to the other, so that these end parts of the glasses are completely covered. This does not objectionally reduce the convenience of grasping the glasses to withdraw them; and it is desirable in some instances as better protecting the glasses and also preventing the hinge parts from unduly wearing the material of the garment pocket in which the holder and the glasses are carried. It will be understood, however, that in any of the examples, the holder may be either shorter or longer than the spectacles or of substantially the same length as the spectacles; these provisions being largely dictated by circumstances or the tastes of the user, and it will be understood that spectacles vary in length and the holders may be made longer or shorter accordingly; different sizes being provided from which the user may select a long or short holder as he may desire or as the user's spectacles may require.

Being composed of only a single piece of sheet metal with the exception of the clip which may be included or omitted as may be desirable, or which may be integral with the single piece of sheet metal in any of the holders after the manner shown in Fig. 10, the cost of production of the holder is extremely low. Having its front open throughout its length, the withdrawal of the spectacles is very convenient, because all parts of the spectacles are readily accessible. The convenience of insertion or withdrawal is also much greater where the holder is open at both ends as in all of the examples except Fig. 10; and having one end closed is not essential in most instances, because the friction of the bows against the edge parts, which in turn presses the frames and lenses securely back against the main back part 2 or 2' of the holder, will usually insure that the spectacles will be properly retained in the holder under all conditions of carriage or handling. When so held the glasses are amply protected against breakage by striking against other objects or by dropping. The holder may have a lining 2'', (Fig. 5).

Any of these holders may have strengthening corrugations, as the transverse corrugations 11 and 12 of Fig. 10. Here only three are shown, one in the middle and the others near the ends. However there may be any number of these. The corrugation 12 is at the junction of the integral clip 9ᵃ, and reinforces the holder and clip.

Also as shown in Fig. 10, one of the edge parts 1' may have an inwardly extended rounded lug 13, which serves to hold down the middle parts of the bows 4 should these be prominent when inserted, as are sometimes found with large tortoise shell frames and the like.

While certain constructional details are deemed preferable in connection with my invention, and I have shown and described these rather specifically in elucidating the construction and use of my invention, as is required, I do not wish to be understood as being limited to such precise showing and description, but having thus fully described my invention, what I claim as new and desire to secure by Letters Patent is:

1. As a new and improved article of manufacture, a spectacle holder composed of a single piece of sheet material of general oblong shape with its longitudinal opposite edge parts bent upwardly and inwardly toward each other, but left separated, whereby a relatively wide space is left between said edges throughout the lengths of said edges, permitting insertion of the spectacles first under one of said edge parts, and then, by yielding of the spectacle bows, insertion of said spectacles under the opposite edge part, and permitting ready access to said spectacles after thus inserted, for sliding said spectacles lengthwise of the holder, one of the ends of said holder being open, whereby said spectacles may be slid lengthwise therefrom.

2. As a new and improved article of manufacture, a spectacle holder composed of a single piece of sheet material of general oblong shape with its longitudinal opposite edge parts bent upwardly and inwardly toward each other, but left separated, whereby a relatively wide space is left between said edges throughout the lengths of said edges, permitting insertion of the spectacles first under one of said edge parts, and then, by yielding of the spectacle bows, insertion of said spectacles under the opposite edge part and permitting ready access to said spectacles after thus inserted, for sliding said spectacles lengthwise of the holder, one of the ends of said holder being open, whereby said spectacles may be slid lengthwise therefrom, and said holder having the opposite end part of its single sheet bent up toward said turned-up edge parts, to prevent sliding of said spectacles out of this opposite end of the holder.

3. As a new and improved article of manufacture, a spectacle-holder composed of a single piece of sheet material of general oblong shape, with its longitudinal opposite edge parts bent upwardly and inwardly and extended part of the way across the holder toward each other, leaving a space between the edges throughout their lengths, and a clip cut out from said sheet and extending from said holder on the side opposite to that toward which said edge parts are bent upward.

4. As a new and improved article of manufacture, a spectacle-holder composed of a single piece of sheet material of general oblong shape, with its longitudinal opposite edge parts bent upwardly and inwardly and extended part of the way across said holder toward each other, leaving a space between the edges throughout their lengths, said sheet having transverse corrugations between said edge parts, stiffening said sheet and maintaining the spaced relation of said edge parts just described.

5. As a new and improved article of manufacture, a spectacle-holder composed of a single piece of sheet material of general oblong shape, with its longitudinal opposite edge parts bent upwardly and inwardly and extended part of the way across said holder toward each other, leaving a space between the edges throughout their lengths, and a clip cut out from said sheet and extending from said holder on the side opposite to that toward which said edge parts are bent upward, said sheet having transverse corrugations between said edge parts, stiffening said sheet and maintaining the spaced relation of said edge parts as just described, and the junction of said clip with said sheet lying within one of said corrugations, whereby said clip is reinforced.

6. As a new and improved article of manufacture, a spectacle-holder composed of a single piece of sheet material of general oblong shape with its longitudinal opposite edge parts bent upwardly and inwardly toward each other, but left separated, whereby a relatively wide space is left between said edges throughout the lengths of said edges, permitting insertion of the spectacles first under one of said edge parts, and then, by yielding of the spectacle bows, insertion of said spectacles under the opposite edge part, and permitting ready access to said spectacles after thus inesrted, for sliding said spectacles lengthwise of the holder, one of the ends of said holder being open, whereby said spectacles may be slid lengthwise therefrom, and said sheet having, on one of said edge parts, substantially midway of the length of the holder, an inwardly extending lug to engage with the middle parts of the spectacle bows when said spectacles are inserted as aforesaid.

VINCENT E. DUNCANSON.

Witnesses:
 JAMES N. RAMSEY,
 CLARENCE PERDEW.